Patented Apr. 4, 1950

2,502,516

UNITED STATES PATENT OFFICE 2,502,516

COCONUT PROCESSING

Elmer F. Glabe, Chicago, Ill., assignor to Food Technology, Inc., Chicago, Ill., a corporation of Illinois No Drawing. Application September 30, 1948, Serial No. 52,131

7 Claims. (Cl. 99—125)

This invention relates to coconut processing in general and more particularly to a process for sweetening raw coconut.

Coconut has found wide acceptance as a food product in the manufacture of candies, cakes, cookies, and other confections. Before coconut can be employed in food products a considerable amount of processing is required to place it in usable form. In most instances, coconut undergoes a preliminary processing operation at the plantation where the coconuts are grown. The coconuts are harvested, opened, and the edible meat is removed from the shell. Then the meat is shredded and dried. The drying operation is carefully regulated so that the coconut fibers are not damaged through overheating, while, at the same time, the moisture content is reduced to a low concentration (for instance, about 4% moisture). The dried fibers are then shipped to processing plants near the consumer market. A small amount of coconut is prepared by shipping the nuts directly to the marketing area where they are processed in a manner similar to that outlined above. The high cost of transportation of whole nuts has resulted in wide acceptance of the practice of preparing shredded coconut at the plantation.

The dried, shredded coconut requires further processing in order to make it an acceptable food product. The flavor of raw coconut is such that sweetening is required before the coconut will meet with wide acceptance. The ordinary method of sweetening raw coconut involves placing the dried coconut shred into a rotary drum and adding sufficient moisture to bring the moisture content to approximately 12%. Then syrup or granulated sugar is introduced into the drum, and the drum is rotated until the sugar has become evenly dispersed throughout the coconut mass. The sweetened coconut then is withdrawn from the rotary drum, after which it may be dried or packaged as moist sweetened coconut.

Sweetening coconut in the manner described above has never been completely satisfactory for the reason that the sugar or syrup tends to accumulate on the surface of the coconut shred without penetrating into the shred in any appreciable amount. As a result, the coconut is not uniformly sweetened, and the amount of sweetening agent which can be applied is limited. Furthermore, if the sugar or sweetening agent does not penetrate into the coconut strand, the excess sweetening agent crystallizes upon drying with the result that the coconut product has a granular and gritty feel. The crystallized surface sugar tends to come off during packaging and shipping operations and collects in the bottom of the container as waste.

The application of sugar to coconut is further complicated by caramelization and subsequent discoloration of the product if it is attempted to apply a large amount of sugar especially when employing high temperatures.

It is an object of the present invention to provide a sweetened coconut in which the sweetening agent is thoroughly dispersed throughout the coconut mass.

Another object of this invention is to provide a sweetened coconut in which the sweetening agent penetrates the coconut strand.

Still another object of this invention is to provide a sweetened coconut which retains its pure white color throughout the processing operations.

A further object of the invention is to provide a process by which a relatively large amount of sweetening agent may be introduced into raw coconut.

These and other objects and advantages of the invention will become more apparent from the following description and examples.

In accordance with the present invention, it has now been found that a coconut food product may be sweetened to any desirable extent. Coconut prepared by the process disclosed herein has been found to be uniformly sweetened throughout the coconut mass and throughout the individual strands or shreds of coconut. Such a sweetened coconut may be dried according to the invention in such a manner that no discoloration of the coconut takes place. The sweetening agent employed in the present invention forms a smooth uniform coating about the coconut strand which does not crystallize or dust off during the packaging and handling of the coconut.

The unusual results outlined above are accomplished by placing a roughly sugared shredded coconut into a vessel which is capable of withstanding either vacuum or pressure and quickly drawing a vacuum about the coconut strands. In this fashion the air and gases are exhausted from the pores of the coconut strand until a uniform vacuum is effected within the pores. The amount of vacuum may vary but is preferably within the range of 5 inches of mercury to complete vacuum. The vacuum is then quickly broken by introducing steam into the vessel where the rapidly introduced heat and pressure serves two purposes. First, the raw sugar quickly reaches the melting point and spreads itself uniformly over the surface of the coconut strand;

secondly, a pressure differential is set up between the pores of the coconut strand which had previously been under vacuum and the area surrounding the strand. The relatively high pressure surrounding the coconut strand then forces the molten sugar into the pores of the coconut strand until the pressure becomes equalized throughout. The steam pressure is carefully regulated so that the temperature does not become high enough to cause caramelization and discoloration of the sugar and coconut. After a short time interval the vessel is vented with subsequent release of pressure. The vessel is opened immediately, the product is removed, and is rapidly cooled by exposure to the room temperature. As a result of the described processing, sugar is uniformly dispersed throughout the pores of the coconut strand as well as on the surface of the coconut strand. Hence, a considerably larger amount of sweetening agent may be introduced without the disadvantage of building up on the surface of the coconut strand.

In a preferred embodiment of the invention, dried unsweetened shredded coconut is placed in a rotary drum and sufficient moisture is added to bring the moisture content to approximately 9%. Then raw sugar in the amount of 20% to 30% by weight of the total mass is sprinkled over the coconut along with a small amount of humectant such as glycerol. Rotation of the drum is continued until the sugar and humectant are thoroughly dispersed throughout the coconut mass. The roughly sugared coconut is then spread onto trays and the loaded trays are introduced into a pressure-vacuum chamber. A vacuum of about 27 inches is drawn on the vessel as quickly as possible in order to pull out air and gases from between the coconut strands and from the pores of the individual strands. As soon as the desired vacuum is reached, steam under superatmospheric pressure is added very rapidly until about one pound (gage) of steam pressure is reached. It has been found that the time required for the addition of steam should be controlled between the limits of about 15 seconds to 75 seconds with 45 seconds being a satisfactory time. The steam pressure is held at one pound for from 30 to 75 seconds in order to allow the sugar to melt and be forced into the pores of the coconut strand. At no time should the temperature of the coconut and/or sugar be allowed to exceed 185 degrees F. Exposure to temperatures in this range reduces the amount of time required for the penetration of molten sugar into the coconut strand, but prolonged exposure to such temperatures results in caramelization and discoloration. The pressure then is quickly released and the vessel is immediately opened and cooled rapidly.

The times and pressures have been found to be critical in this operation if one is to achieve the desirable results outlined above. The vacuum must be broken quickly by the addition of steam, and the one pound steam pressure must be achieved quickly in order to melt the sugar so that it may be introduced into the pores of the coconut strand while there still remains a pressure differential between the interior of the pores and the exterior. At the same time the steam pressure must not be held for too long a period because the sugar and coconut will become overheated and will caramelize with discoloration. Somewhat higher steam pressures, preferably not more than 10 pounds per square inch (gage) may be used so long as the time of treatment is such as to avoid substantial scorching or caramelization.

The sweetened, cooled coconut may be packaged in the moist state, or it may be dehydrated. If coconut is to be canned in the moist state it should contain from 10% to 13.5% by weight of moisture or preferably about 11% to 11.5% by weight of moisture. This moisture content may be accurately adjusted during the pressure vessel since coconut will normally absorb 2% to 3% water during the steam treatment. The hot, moist coconut may be canned at once, followed by vacuum sealing of the can. If a vacuum of not less than 20 inches of mercury is drawn on the can, further sterilization will not be required. The pressure treatment followed by canning under vacuum successfully inhibits bacterial growth during storage. If desired the can may be filled with enough nitrogen or carbon dioxide to reduce the vacuum from 20 inches to 5 inches of mercury with similar good keeping qualities.

In connection with dehydration of coconut, it has been discovered that low temperature dehydration has significant advantages over the ordinary high temperature dehydration. In the first place, low temperatures of the order of 110 degrees F. to 140 degrees F. dry the coconut just as fast as higher temperatures, e. g., 170 degrees F. to 180 degrees F. Secondly, low temperature dehydration eliminates caramelization of the sugars. Thirdly, a coconut product sweetened and dried according to the above described methods is characterized by a continuous and smooth sugar film about the strand instead of sugar crystals on the surface. This sugar film is encouraged by the controlled rate of evaporation at low temperatures in contrast to the individual crystals which tend to form when drying is done at high temperatures.

As examples of moist, sweetened coconut which may be prepared in the above disclosed manner, the following products have been prepared:

*Example I—Low sugar*

| | Pounds |
|---|---|
| Coconut (desiccated shred containing 4% moisture) | 50 |
| Water | 6 |
| Salt | 0.1 |
| Sugar | 15 |

The above ingredients were placed in a rotary drum and rotated until complete mixing had been effected. Then the product is introduced into the pressure-vacuum vessel and processed according to the method heretofore described. The resulting finished sweetened coconut contained approximately 12½% moisture and was either canned at once or was dehydrated to 6% moisture.

*Example II—High sugar*

| | Pounds |
|---|---|
| Coconut (desiccated shred containing 4% moisture) | 50 |
| Water | 7½ |
| Salt | 0.1 |
| Sugar | 32½ |

The above ingredients were thoroughly mixed in a rotary drum and then were processed according to the previously described method. Upon withdrawal from the vessel the product contained approximately 12.8% moisture and could be packaged immediately as moist, sweetened coconut.

The sweetening agent normally used is refined, granulated cane or beet sugar. Liquid sugar, which is a highly concentrated water solution of sucrose, may be employed if the quantity of water in the syrup is carefully adjusted to conform to the above formula. Glucose syrup and very frequently quantities of invert sugar are also used along with the sucrose. The color of the sugar used materially affects the color of the finished coconut.

The sweetening agent ordinarily used in the sweetening of coconut is refined, granulated cane or beet sugar.

It will be seen from the foregoing disclosure that I have achieved a new and unusual method for the preparation of sweetened coconut. By the practice of this invention it becomes possible to introduce a large amount of sweetening agent into unsweetened coconut. At the same time, it is possible to apply the sweetening agent in a continuous, smooth, non-crystalline film which does not dust off on further processing. Coconut processed according to this invention retains its natural milk-white color and is not subject to the usual discoloration which comes from the caramelization of sugar and coconut when previously known methods are employed.

The invention is hereby claimed as follows:

1. The method of preparing sweetened coconut which comprises intimately mixing coconut fibers with a solid sweetening composition, evacuating air from the pores of said fibers, melting said sweetening composition by the addition of superatmospheric steam and forcing said molten sweetening composition into said evacuated pores by steam pressure.

2. The method of preparing sweetened coconut which comprises intimately mixing coconut fibers with a solid sweetening composition, evacuating air from the pores of said fibers, melting said sweetening composition by the addition of superatmospheric steam and forcing said molten sweetening composition into said evacuated pores by steam pressure and dehydrating said sweetened coconut fibers at a temperature of 110 degrees to 140 degrees F.

3. The method of preparing sweetened coconut which comprises intimately mixing coconut fibers with sugar, evacuating air from the pores of said fibers, melting said sugar by the addition of superatmospheric steam and forcing said molten sugar into said evacuated pores by steam pressure, and dehydrating said sweetened coconut fibers at a temperature of 110 degrees to 140 degrees F.

4. The method of preparing sweetened coconut which comprises intimately mixing coconut fibers with a solid sweetening composition, evacuating the air from the pores of said coconut fibers by a vacuum of from 5 to 29 inches of mercury, quickly breaking said vacuum by the introduction of superatmospheric steam sufficient to melt said sweetening composition, said steam pressure forcing said molten sweetening composition into said evacuated pores.

5. The method of preparing sweetened coconut which comprises intimately mixing coconut fibers with raw sugar, subjecting said mixture to a vacuum of from 5 to 29 inches of mercury, adding superatmospheric steam to a pressure of from 1 to 10 pounds per square inch gage, said steam addition being accomplished in from 15 to 75 seconds, holding said pressure at from 1 to 10 pounds per square inch gage for 30 to 75 seconds, quickly exhausting said steam pressure and cooling said coconut mixture.

6. The method of preparing sweetened coconut which comprises intimately mixing coconut fibers with raw sugar, subjecting said mixture to a vacuum of from 5 to 29 inches of mercury, adding superatmospheric steam to a pressure of from 1 to 10 pounds per square inch gage, said steam addition being accomplished in from 15 to 75 seconds, holding said pressure at from 1 to 10 pounds per square inch gage for 30 to 75 seconds, quickly exhausting said steam pressure and cooling said coconut mixture and dehydrating said sweetened coconut fibers at a temperature of 110 degrees to 140 degrees F.

7. The method of preparing sweetened coconut which comprises intimately mixing coconut fibers with raw sugar, subjecting said mixture to a vacuum of about 27 inches of mercury, adding superatmospheric steam to a pressure of 1 pound per square inch gage, said steam addition being accomplished in about 45 seconds, holding said pressure for 45 to 60 seconds, quickly exhausting said steam pressure and cooling said coconut mixture.

ELMER F. GLABE.

REFERENCES CITED

The following references are of record in the file of this patent:

UNITED STATES PATENTS

| Number | Name | Date |
|---|---|---|
| 202,521 | Chase | Apr. 16, 1878 |
| 527,139 | Closson | Oct. 9, 1894 |
| 683,112 | Gaines | Sept. 24, 1901 |
| 666,413 | Dunnachie | Jan. 22, 1901 |
| 1,348,688 | Baker | Aug. 3, 1920 |
| 1,861,307 | Gernhardt | May 31, 1932 |
| 1,890,475 | Todd | Dec. 13, 1932 |

FOREIGN PATENTS

| Number | Country | Date |
|---|---|---|
| 2,435 | Great Britain | of 1900 |